US006910848B1

(12) United States Patent
Baugh

(10) Patent No.: US 6,910,848 B1
(45) Date of Patent: Jun. 28, 2005

(54) ERECTOR FOR J-LAY PIPE LAYING SYSTEM

(76) Inventor: Benton F. Baugh, 14626 Oak Bend, Houston, TX (US) 77079-6441

(*) Notice: Subject to any disclaimer, the term of this patent is extended or adjusted under 35 U.S.C. 154(b) by 0 days.

(21) Appl. No.: 09/301,694

(22) Filed: Apr. 29, 1999

Related U.S. Application Data

(60) Provisional application No. 60/083,964, filed on May 1, 1998.

(51) Int. Cl.[7] .................................................. F16L 1/12
(52) U.S. Cl. ................................. 414/745.7; 414/746.8
(58) Field of Search ...................... 175/85; 414/22.53, 414/22.54, 22.55, 745.4, 745.7, 746.8

(56) References Cited

U.S. PATENT DOCUMENTS

| | | |
|---|---|---|
| 3,331,212 A | 7/1967 | Cox et al. |
| 3,472,034 A | 10/1969 | Lawrence |
| 3,524,326 A | 8/1970 | Craste |
| 3,581,506 A * | 6/1971 | Howard .................... 175/85 X |
| 3,602,175 A | 8/1971 | Morgan et al. |
| 3,680,322 A * | 8/1972 | Nolan, Jr. et al. .......... 405/166 |
| 3,747,356 A | 7/1973 | Lochridge et al. |
| 3,860,122 A | 1/1975 | Cernosek |
| 3,937,334 A * | 2/1976 | Bleyl et al. .............. 414/22.53 |
| 4,091,629 A | 5/1978 | Gunn et al. |
| 4,202,653 A | 5/1980 | Moller |
| 4,324,194 A | 4/1982 | Elliston |
| 4,340,322 A | 7/1982 | Springett et al. |
| 4,347,029 A | 8/1982 | Latimer et al. |
| 4,486,123 A * | 12/1984 | Koch et al. .................. 405/169 |
| 4,569,168 A | 2/1986 | McGovney et al. |
| 4,704,050 A | 11/1987 | Wallace |
| 4,917,540 A | 4/1990 | Recalde |
| 5,000,416 A | 3/1991 | Fantasia |
| 5,145,289 A | 9/1992 | Titus |
| 5,421,675 A * | 6/1995 | Brown et al. ................ 405/170 |
| 5,458,441 A | 10/1995 | Barry |
| 5,464,307 A * | 11/1995 | Wilkins ....................... 405/166 |
| 5,527,134 A | 6/1996 | Recalde |
| 5,603,588 A | 2/1997 | Herbert |
| 5,971,666 A | 10/1999 | Martin et al. |
| 6,213,686 B1 * | 4/2001 | Baugh .......................... 405/166 |
| 6,273,643 B1 | 8/2001 | Baugh |
| 6,293,732 B1 | 9/2001 | Baugh |

FOREIGN PATENT DOCUMENTS

GB        1178219        1/1970

* cited by examiner

Primary Examiner—Janice L. Krizek

(57) ABSTRACT

A system for laying a pipeline from a floating vessel onto the ocean floor in relatively deep ocean water which provides an erector for raising new pipe sections to be added to a pipeline which is depending from the system, the pipe sections being raised into accurate alignment with the mast of the system although the mast is free to be gimbaled in any direction within two degrees of angular freedom.

13 Claims, 13 Drawing Sheets

ERECTOR FOR J-LAY PIPE LAYING SYSTEM

RELATED APPLICATIONS

This application is a continuation of provisional application No. 60/083,964 filed May 1, 1998, incorporated herein by reference.

BACKGROUND OF THE INVENTION

1. Field of the Invention

This invention relates generally to laying underwater pipelines in relatively deep water using a J-Lay method from a floating vessel and, more particularly, to installing underwater pipelines on the seabed and/or connecting the same to floating terminals at the surface.

2. Description of the Related Art

Subsea pipelines have most often been laid on the ocean floor by connection of welding on the deck of a barge, lowering off the back of the barge down a stinger, and then laying on the ocean floor. The curve down off the barge and then reverse curve onto the ocean floor gives a "S" bend in the pipeline during the lay process. The stinger allows the pipeline and its associated weight to be curved down toward the ocean floor without kinking or damaging the pipeline. As water depths become greater; the size, weight, and cost of the stinger become prohibitive.

In deeper water, it is advantageous to connect the pipeline vertically and lower it directly into the water, with a single bend at the ocean floor. This gives the shape of a "J" for a system known as J-Laying pipe. The "J" cannot be vertical at the top, but rather must have an angle with a horizontal component to be able to pull horizontal tension on the pipeline as it is being laid onto the ocean floor. If it does not have horizontal tension, it will buckle as it is laid on the ocean floor and be damaged beyond use.

Previous J-Lay Towers have lowered the pipe vertically and required that the pipe be bent around a cone shaped stinger to gain the required exit angle, or have had fixed angle towers with the ideal exit angle approximated. Bending the pipe around a stinger from a vertical tower makes the connections difficult and induces a high degree of stress in the pipeline.

The fixed angle towers require that the vessel drive along the pipe route in order to lay the pipeline. In cases where there is a cross wind or cross current, it can be advantageous to turn the vessel into the weather move the vessel somewhat sideways down the pipeline route. In some cases, the vessels will not have the power to hold course when being broadsided by the weather but could hold course if it could face the weather. In other cases, the stability of the vessel is simply better when facing the weather.

Additionally, as water depths and pipeline tension requirements change, the necessary angle of departure of the pipeline can change. Past J-Lay towers have had limited capability at best for changing the angle of the tower to facilitate laying the pipelines.

Rigidly installed, vertical towers engender a number of problems caused by an inability to respond in real time to the dynamic forces encountered during pipe laying operations. For instance, welding and assembly operations are performed at the working floor on pipe with a substantial imposed moment. Other deficiencies include the fact that they do not allow: 1) control of the bending stress and tension within the pipe string as it is deployed in an arc to the sea bed; 2) the laying vessel to weather vane or rotate about the pipe and thereby prevent torsional wind-up of the pipe string; and 3) precise control of the pipe lay envelope. Further, current J-Lay tower designs omit any means for precise and accurate alignment of the pipe string and new pipe joints during the welding process.

Current stinger designs have a problem in that the internal geometry of the stinger is usually fixed at the diameter of the pipe string being deployed. In order to allow the passage of large diameter packages integrated into the pipe string, the stinger must be dismantled or removed from around the hanging pipe string. Additionally, such stingers only act as guide conduits for the pipe and do not stabilize, i.e., control the alignment of, the pipe as it emerges from the weld floor.

An additional alternative to the laying of steel pipelines for this type service has been to lay flexible pipelines. As the pipeline is basically a long pressure vessel, it is inherently obvious that a simple steel tube pipeline would be substantially more economical to manufacture and more reliable than a multi-part flexible pipeline or hose of the same internal diameter and the same high pressure rating. These flexible pipelines have found a place in the market due to the difficulties in the field installation of the lower capital cost steel tube pipeline. The J-Lay Tower attempts to enhance the cost effectiveness of the installation of the steel tube pipeline alternative.

The present invention is directed to overcoming, or at least reducing the effects of, one or more of the problems set forth above.

SUMMARY OF THE INVENTION

The object of this invention is to provide a tower which can be gimbaled to different angles while facilitating the welding of pipeline sections for laying pipelines on the ocean floor from a floating vessel.

A third object of this invention is to provide means for accurately aligning the ends of the pipelines for welding and laying.

Another object of this invention is to provide means to raise a new section of pipe to a position for welding to the pipeline.

Another object of this invention is to provide means to raise a new section of pipe from a horizontal position to a position of accurate alignment with a mast which can be gimbaled to any angle within 2 degrees of rotational freedom.

Another object of this invention is to provide means for the support of the pipeline while lowering it as new sections are added by welding.

Other objects and advantages of the invention will become apparent upon reading the following detailed description and upon referring to the drawings which follow.

Figure 1:
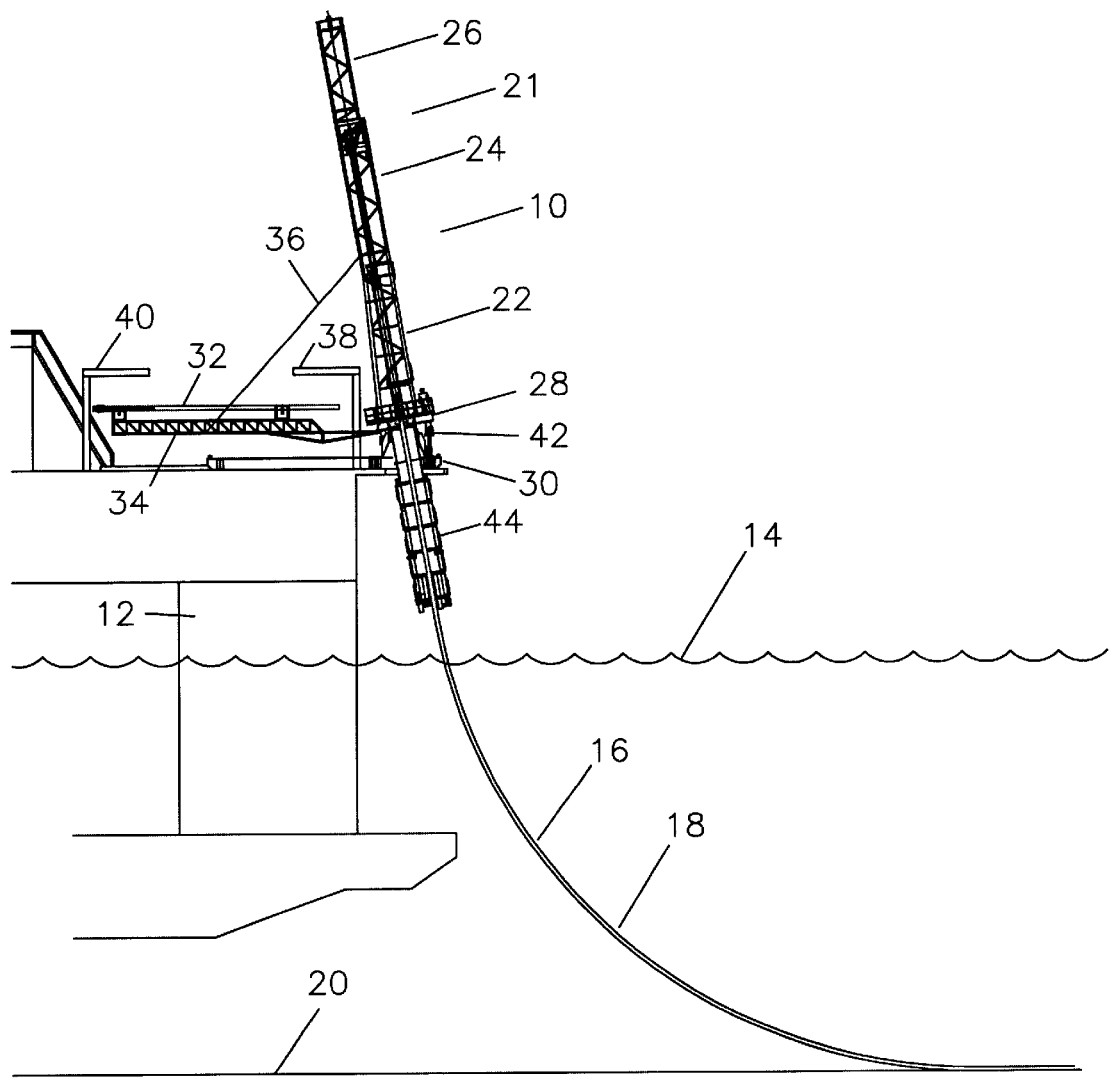
FIG. 1 illustrates the apparatus for assembling and deploying pipe string underwater, mounted on the rear of a floating vessel and deploying a pipeline.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover ail modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Referring now to FIG. 1, the j-lay tower 10 is shown on a floating vessel 12 in a body of water 14 with a pipeline 16 extending below the j-lay tower 10 around a bend 18 and onto the ocean floor 20. The j-lay tower 10 is shown with a mast 21 including a lower section 22, a middle section 24, and an upper section 26; a working table 28; and a skid 30. A new pipeline section 32 is shown on the erector 34 with cable 36 attached for pulling the erector up to the mast sections. Jib cranes 38 and 40 are provided for handling of the new pipe section 32 up to the erector 34. As can be noted, the tower is inclined at an angle convenient to the laying of the pipeline. Jack assemblies, 42 as will be described later, assist in the changing of the tower angle as required. Stinger 44 provides internal rollers whose inner diameter provide a curvature to prevent overbending of the pipeline. The preferred running style is with the tower perfectly aligned to the pipeline, while using the angle gained around the curvature of the stinger as a margin of error if unforeseen events occur.

Figures 2, 3:
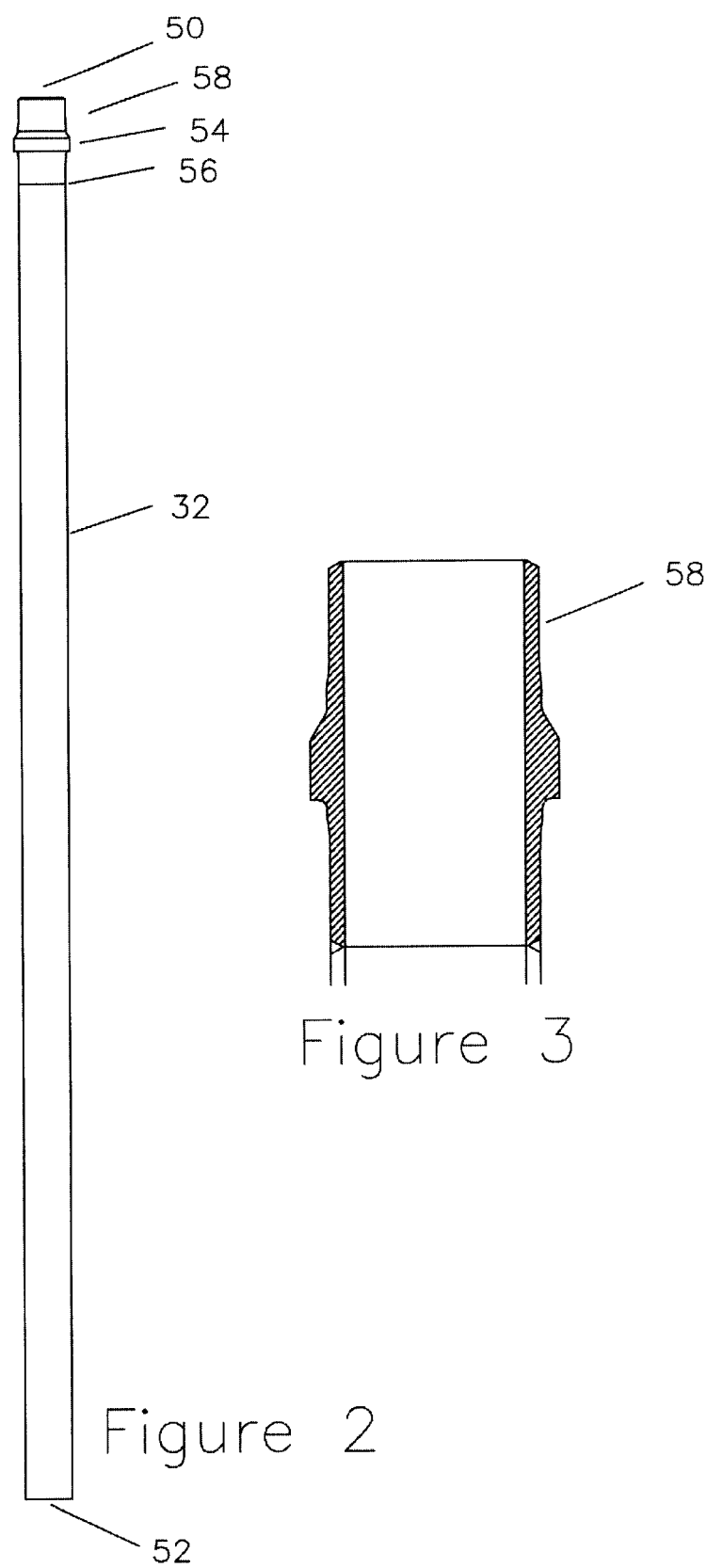
FIG. 2 shows a section of pipeline which has a shoulder at the upper end for handling and weld preparations at each end.
FIG. 3 shows a half section enlargement of the shoulder at the top of the section of pipeline of FIG. 2.

Referring now to FIG. 2, a pipe section 32 shows upper weld preparation 50, lower weld preparation 52, shoulder 54, and buttweld 56. Buttweld 56 is made on shore to attach the j-lay collar 58 to a plain section of pipe so that the plain section of pipe can be conveniently handled offshore.

Referring now to FIG. 3, an enlarged view of the j-lay collar 58 is shown.

Figure 4:
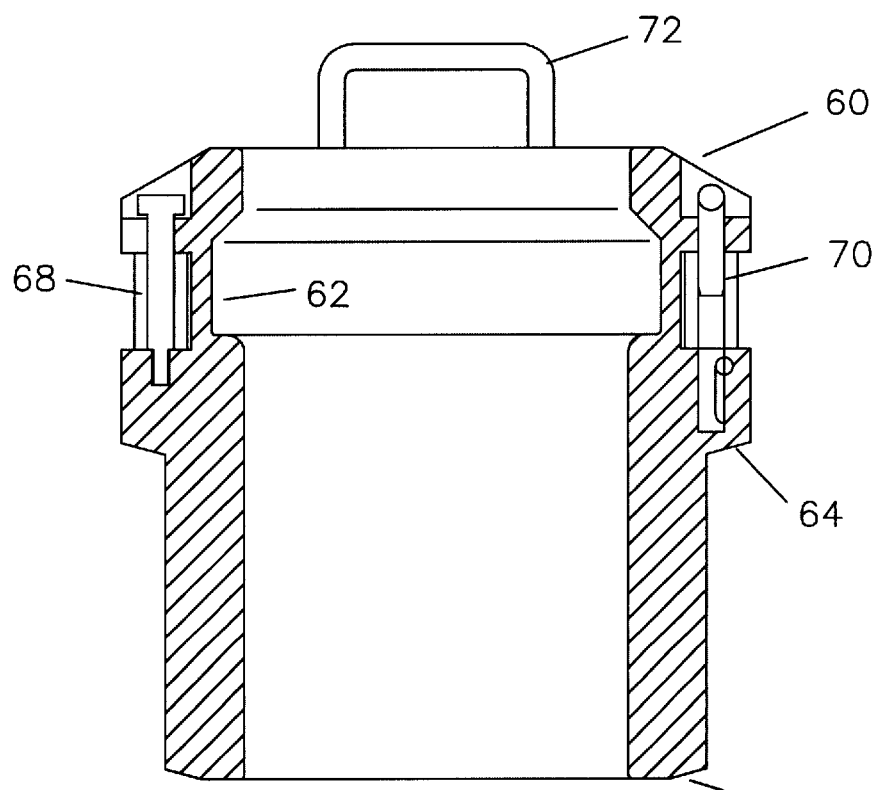
FIG. 4 shows a half section of a double collar which is used to wrap around the shoulder of the pipe depicted in FIG. 3 for the purpose of providing two independent shoulders for handling.

Referring now to FIG. 4, a double collar 60 is shown which is made in two halves and can be wrapped around the shoulder 54 on j-lay collar 58. After welding a new section of pipeline to the pipeline 16 hanging from the tower, two shoulders are required as will be discussed later. The double collar 60 engages the j-lay collar with a groove 62 and provides an upper shoulder 64 and a lower shoulder 66. Hinge 68 allows the double collar 60 to open and latch 70 holds it closed during operations. Handles 72 are provided for handling.

Figure 5:
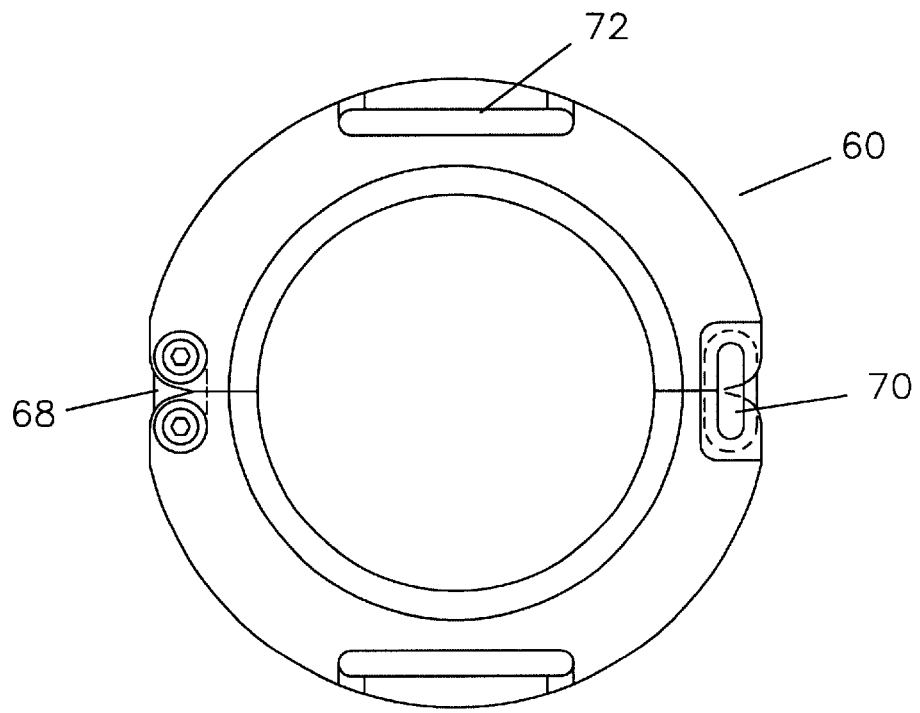
FIG. 5 shows a top view of the double collar of FIG. 4.

Referring now to FIG. 5, a top view of the double collar 60 is shown.

Figure 6:
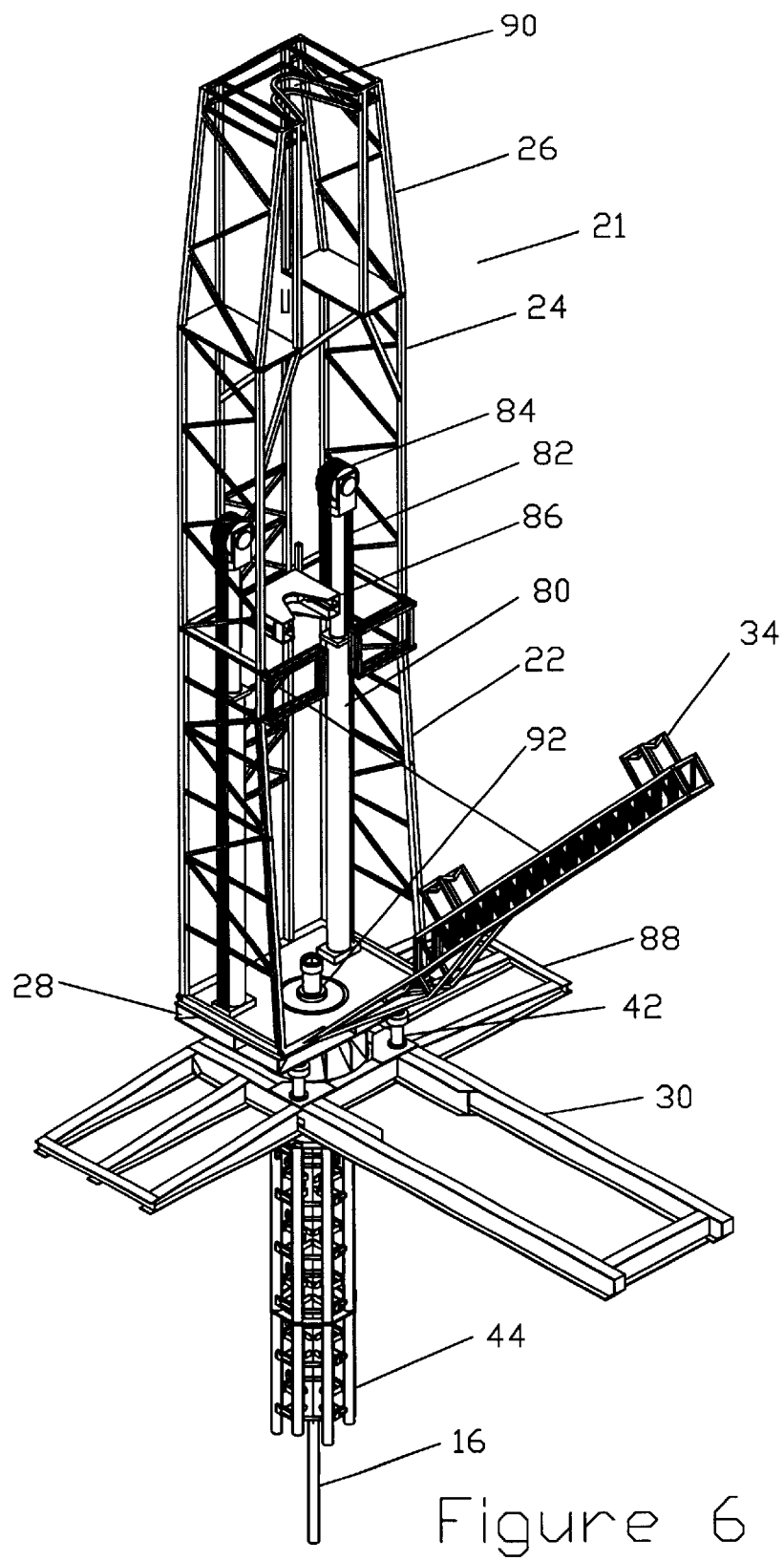
FIG. 6 shows a more detailed perspective view of the apparatus.

Referring now to FIG. 6, a perspective view of the apparatus is shown with the erector 34 shown partially raised toward the mast sections 22, 24, and 26. Main cylinders 80, with cables 82 over drums 84 are used to lift the travelling table 86 to power the system. Outriggers 88 are used to distribute the weight of the system over a large deck area. Notch 90 in the top of the upper mast section 26 allows longer sections of new pipe to be added to the pipeline by having intermediate j-lay collars in place. Bushings 92 are provided for the support of the pipeline at the working table 28.

Figure 7:
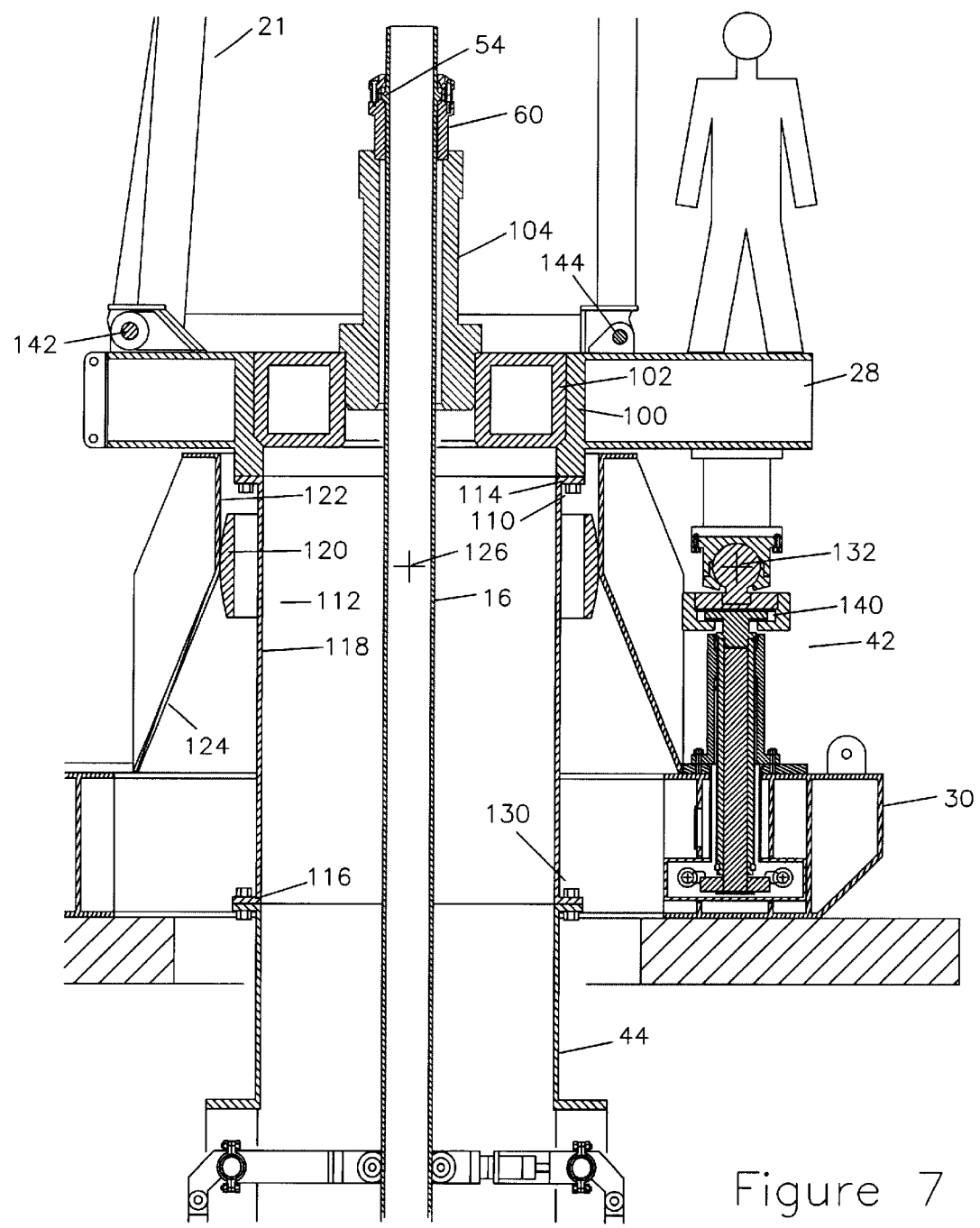
FIG. 7 is a partial cross-sectional, side view of part of the tower system.

Referring now to FIG. 7, a half section thru the working table 28 area is shown with the 62" bowl 100 forming the internal portion of the working table 28, the 62" split bushing 102 landed in the 62" bowl 100, the 26" split bushing 104 landed on the 62" split bushing 102, and the double collar 60 landed on the 26" bushing 104, in turn supporting the pipeline 16 upon shoulder 54.

Attached to the bottom of 62" bowl 100 by bolts 110 is a stinger swivel 112 including an upper flange 114, a lower flange 116, a central barrel 118, and a spherical section 120. The spherical section 120 fits closely within a cylindrical bore 122 which is attached by conical member 124 to skid 30 by welding. Spherical section 120 has a spherical center 126. Bolts 130 connect stinger 44 to the lower flange 116 of the stinger swivel 112, and will be further described later.

Each of three Jack assemblies 42 includes a spherical center 132. Each of the three jack assembly spherical centers 132 and the stinger swivel spherical center 126 are approximately in a common plane. Three jack assemblies are shown as they can be used at the bottom of their stroke for a horizontal working table, and only be extended up for tilting the table. An alternative embodiment would be to use 2 jacks and one rigid leg. This would simplify the construction from the fact that only two powered jacks would be required, but would complicate it in that the jacks would need to start in mid stroke for a horizontal plane and would each require a longer stroke.

The working table 28, stinger swivel 112, and the jack assemblies 42 are shown in their lowest position with respect to the skid 30. If any one of the three jack assemblies 42 are actuated to move upwardly, the portion of the working table 28 above that jack assembly will be raised, tilting the working table and all parts attached to the working table including the mast, stinger swivel, and stinger. The mast is intended to operate in a near vertical mode, i.e. +/−15 to 25 degrees from vertical.

If there is a high pipeline load, i.e. 1,000,000 lbs., along the pipeline 16 and the working table and pipeline are tilted, one can readily see that there would be a vertical and horizontal component to the 1,000,000 lbs. The jack assemblies 42 are tall and slender and adapted to support a vertical load, but not well adapted to support a horizontal load. A slip plane 140 is established in the jack assembly 42 to prevent a horizontal or side load from being imparted into the jack assemblies 42. With the jack assemblies 42 having little ability to support a horizontal force, the tendency to move horizontally is blocked by the engagement of the spherical section 120 with the cylindrical bore 122. With the cylindrical bore 122 having no capacity to support a vertical load, the components of force are divided into the vertical force to the jack assemblies and the horizontal force to the stinger swivel.

Mast 21 is connected to the working table 28 by a pivot pin 142 and a locking pin 144, which will be discussed later in conjunction with erecting the mast.

Figure 8:
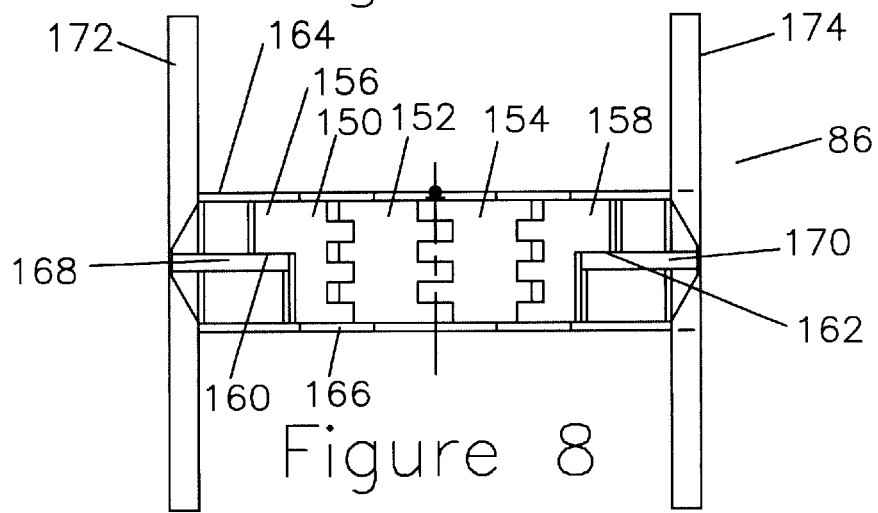
FIG. 8 is a front view of the clamp assembly which will engage and lower the double collar and therefore the pipeline.

Referring now to FIG. 8, a front view is seen of the travelling table 86 showing the main clamp section 150, two doors 152 and 154, and two wing portions 156 and 158 with lower bearing surfaces 160 and 162. The travelling table 86 itself is fabricated of a top plate 164, a bottom plate 166, a left plate 168, a right plate 170, a left guide 172 and a right guide 174. Wing portions 156 and 158 bear and support on left plate 168 and right plate 170 respectively.

Figure 9:
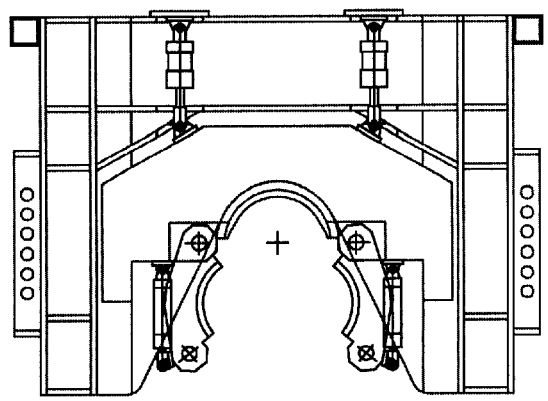
FIG. 9 shows a top view of the clamp assembly of FIG. 8 with the doors open for accepting the double collar.

Refer now to FIG. 9 showing a top view of the travelling table, doors 152 and 154 are swung open to allow the insertion of the pipeline.

Figure 10:
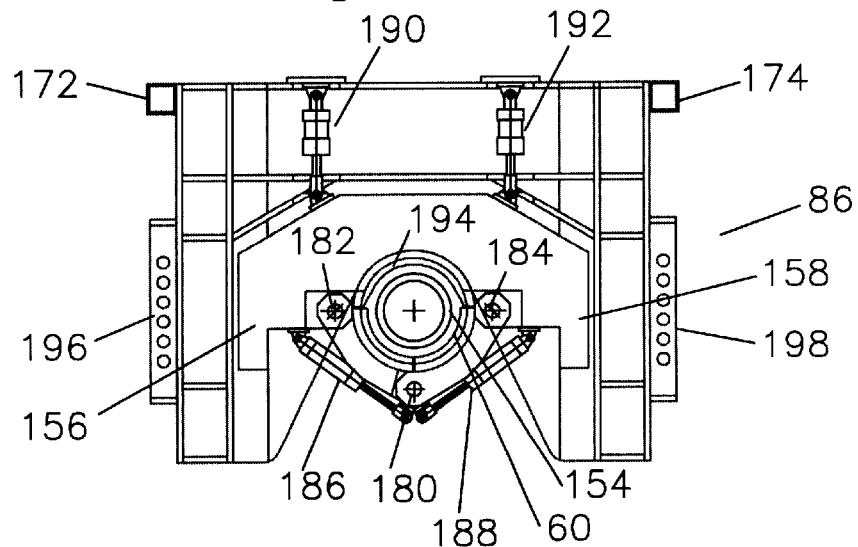
FIG. 10 shows the clamp assembly of FIG. 9 with the doors closed around the double collar and pipeline.

Referring now to FIG. 10, the doors 152 and 154 are closed as if to accept the pipe for support, with pin 180 installed to keep the doors closed. Hinge pins 182 and 184 allow for the opening of the doors 152 and 154 and cylinders 186 and 188 power the movement of the doors. Cylinders 190 and 192 provide means to slide the clamp assembly backwards and forwards to allow the shoulder 194 to be moved away from or under the shoulder on the double collar 60. (See FIG. 12)

Plates 196 and 198 provide attachment holes for the cables 82 as seen in FIG. 6 to lift the travelling table 86 and therefore the pipeline 16. The holes in plates 196 and 198 are a substantial distance apart which is difficult to bridge safely by a single member because of the high moment generated by the overall distance. The method of this construction allows the main clamp section 150 to only be required to bridge between the support of plates 168 and 170, and therefore substantially reduce stresses on the parts generated by this first moment. Additionally the second moment established in the travelling table is a function of the distance between the support of plate 168 and 170 areas and the holes for the cables on the outside. Therefore, the stress in upper plate 164 and lower plate 166 is generated by the second moment in which is again substantially smaller than the moment which would be generated by similar forces across the full distances from plates 196 and 198. By this means the division of distances provides lower stresses than might otherwise be seen and allows a workable system at lower overall cost and weight.

Figure 11:
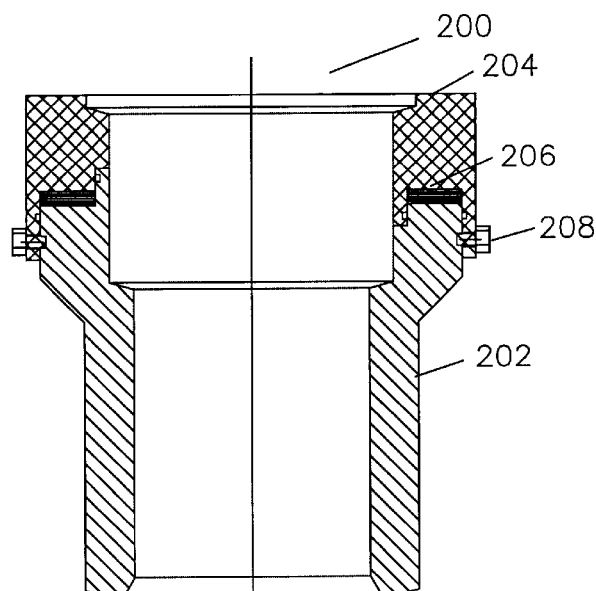
FIG. 11 shows a half section of the swivel bearing

Referring now to FIG. 11, a rotating bushing 200 is shown which allows the rotation of the pipeline 16 relative to the floating vessel 12. The unit is made of a lower non-rotating body 202, an upper rotating body 204, several low friction bearing rings 206, and a retaining screws 208.

Figure 12:
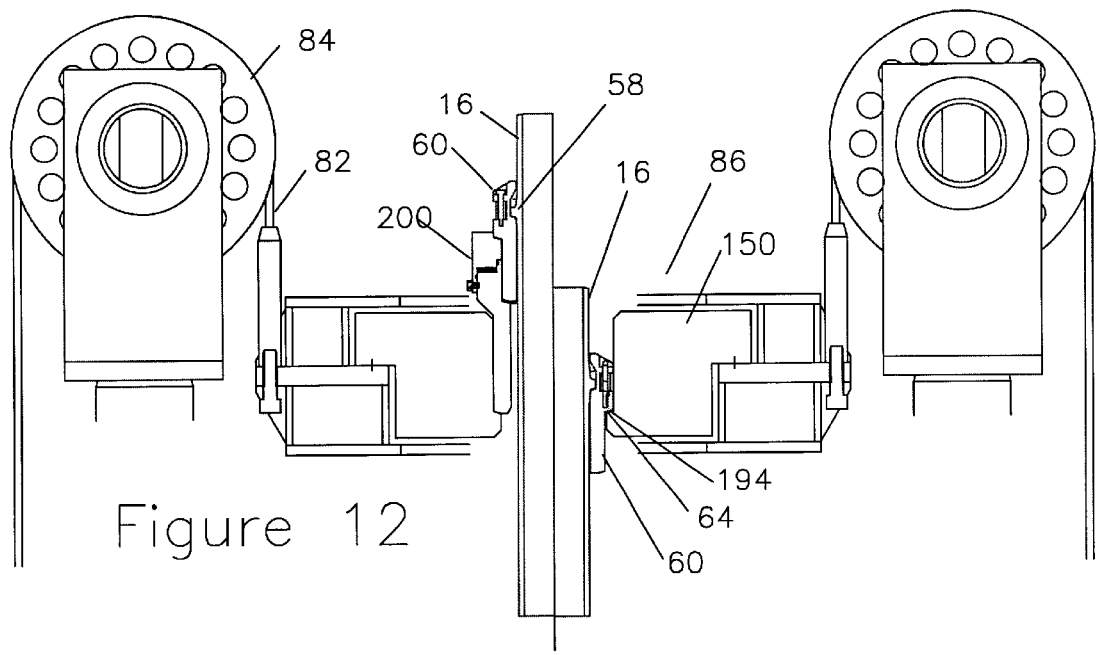
FIG. 12 shows the clamp assembly at the top of its stroke between the main drums or pulleys, with the double collar engaging the pipeline and clamp shoulder on the right side of the centerline and also the swivel bearing inserted between the double collar and the clamp shoulder on the left side of the centerline

Referring now to FIG. 12, the travelling table is shown near its uppermost position between the drums 84. On the right side of the centerline a double collar 60 is shown around the j-lay collar 58, with the upper shoulder 64 landed on the shoulder 194 within the main clamp section 150. The left side of the centerline shows the rotating bushing 200 landed over the end of the pipeline 16 and the double collar 60 clamped around the j-lay collar 58. Picking up on the travelling table 86 causes the weight of the pipeline 16 to be carried on the low friction bearings 206 within the rotating bushing 200, conveniently allowing the pipeline 16 to be rotated relative to the floating vessel 12.

Figure 13:
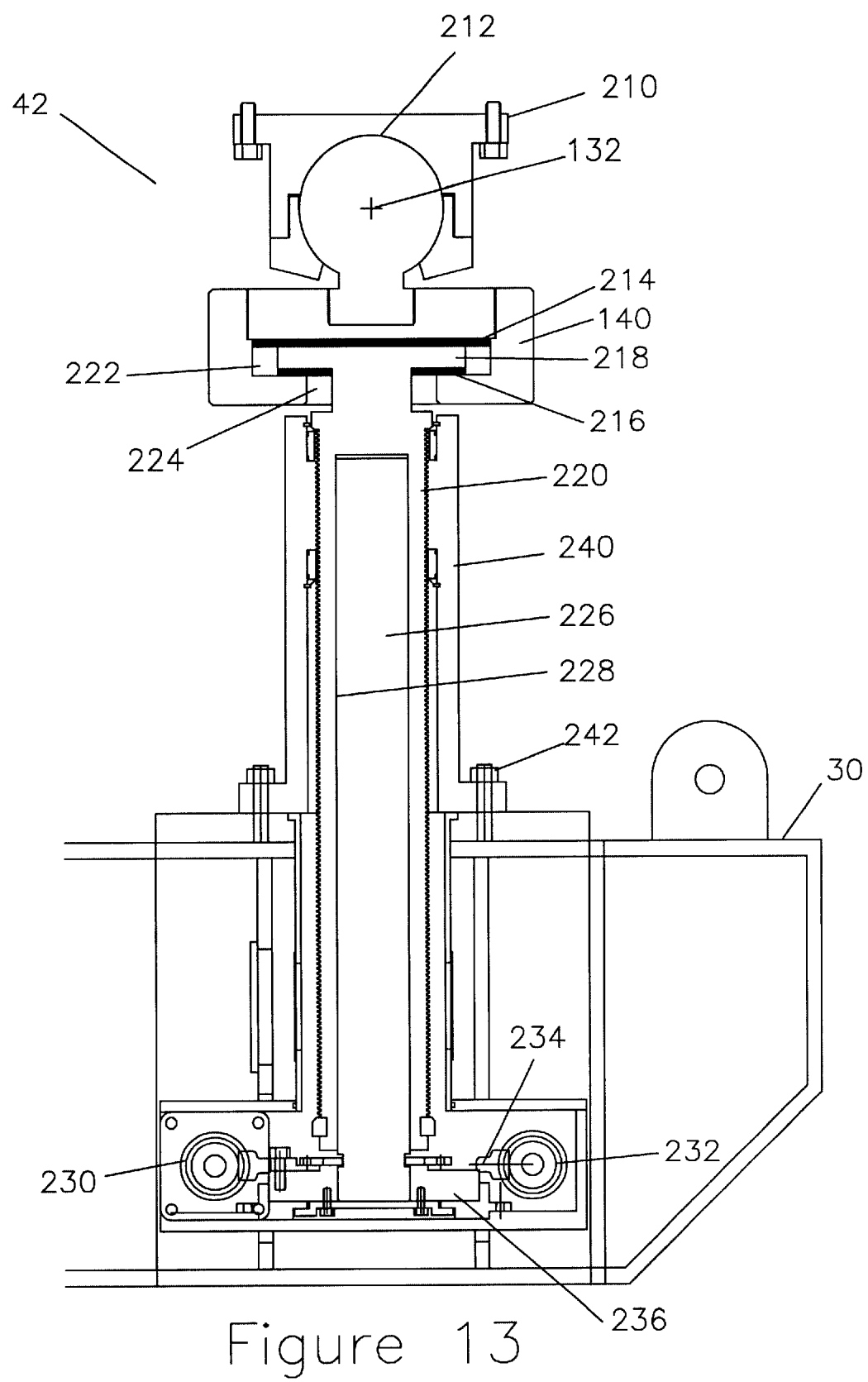
FIG. 13 is a half section view of a screw jack as employed in the articulating joint.

Referring now to FIG. 13, a jack assembly 42 is shown in detail. The upper end has a flange 210 for interconnecting to the bottom of the working table 28 and a spherical section 212 around the spherical center 132 as previously discussed. A slip plane 140 is established by having upper and lower low friction bearings 214 and 216 and a flange 218 positioned between the bearings. The flange 218 is a part of a male threaded shaft 220 which is rotated by gear 234 to move the upper portion of the jack assembly 42 up and down.

Side gaps 222 and 224 allow for the slip plane 140 to provide horizontal freedom in addition to rotary freedom. A square shaft 226 engages a square hole 228 and causes the male threaded shaft 220 to be rotated in response to the input of motors (not shown), which drive worm gears 230 and 232, wheel gear 234, and interconnecting pieces 236. Internally threaded base 240 utilizes bolts 242 to secure the jack assembly 42 to skid 30.

Figure 14:
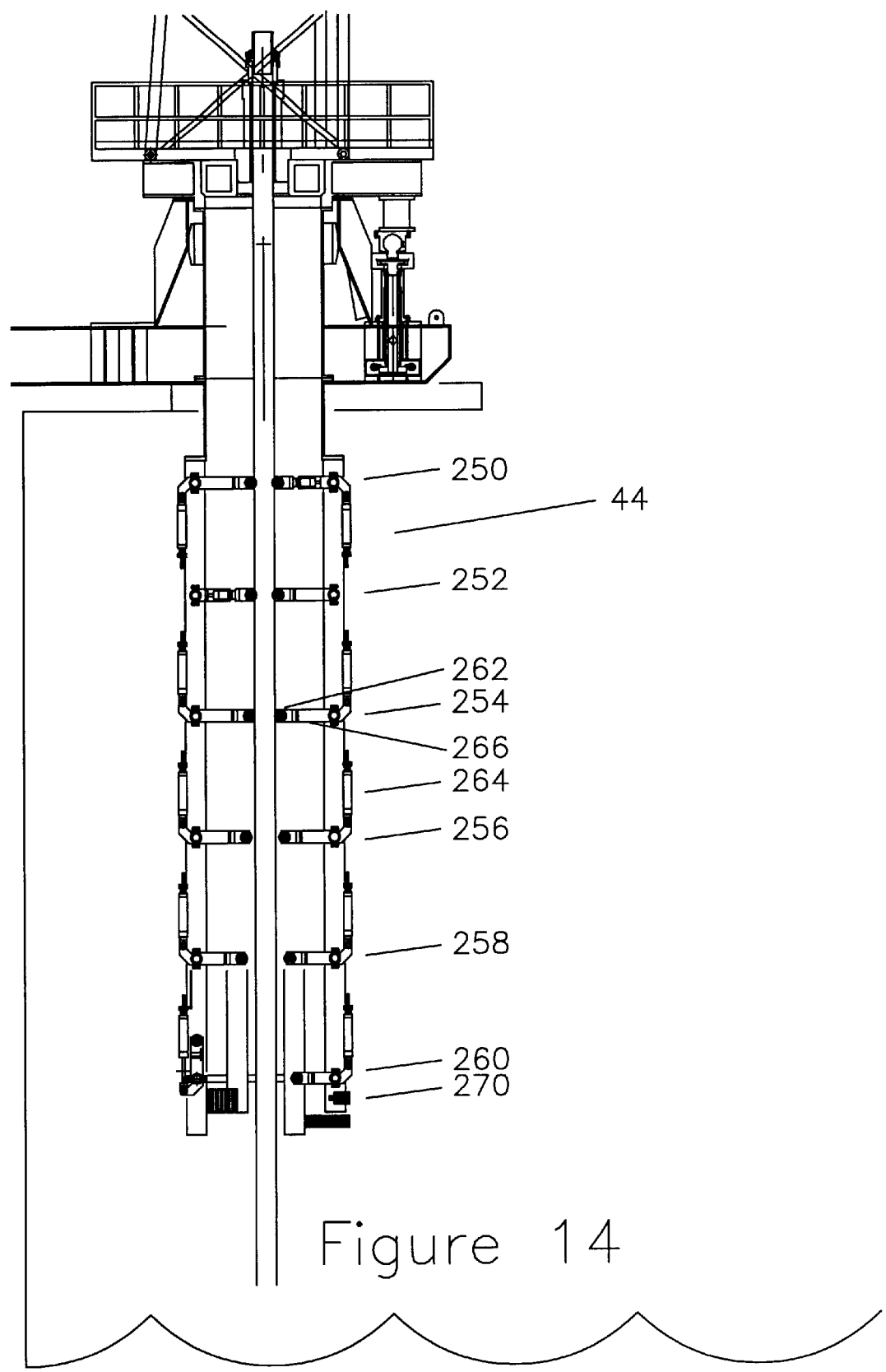
FIG. 14 illustrates the stinger of the apparatus which minimizes the bending radius of the exiting pipeline.

Referring now to FIG. 14, stinger 44 is shown comprised of six stations 250, 252, 254, 256, 258, and 260 which include multiple rollers 262 to restrict the bending radius of the pipeline. All stations are equipped with cylinders 264 to swing the arms 266 and rollers 262 of the stations out of the bore to allow large object to pass through the stinger and into the bore to provide the preferred bending radius. Stations 250 and 252 have four arms 266 at 90° apart. Two adjacent arms 266 fold down to a fixed position at a distance from the centerline of the stinger approximately equal to the radius of the pipeline 16. The other two arms 266 include cylinders 264 which press the rollers 262 on the arms 266 tightly against the pipeline 16 after being folded into the bore of the stinger 44. In this manner, the pipeline 16 is immobilized against movement during the welding process.

Each of the additional stations 254–260 have arms 266 which fold down to a fixed position of a progressively larger radius from top to bottom. At the bottom of the stinger 44, a camera 270 or similar viewing device is installed to monitor the position of the pipeline 16 within the stinger 44.

Figure 15:
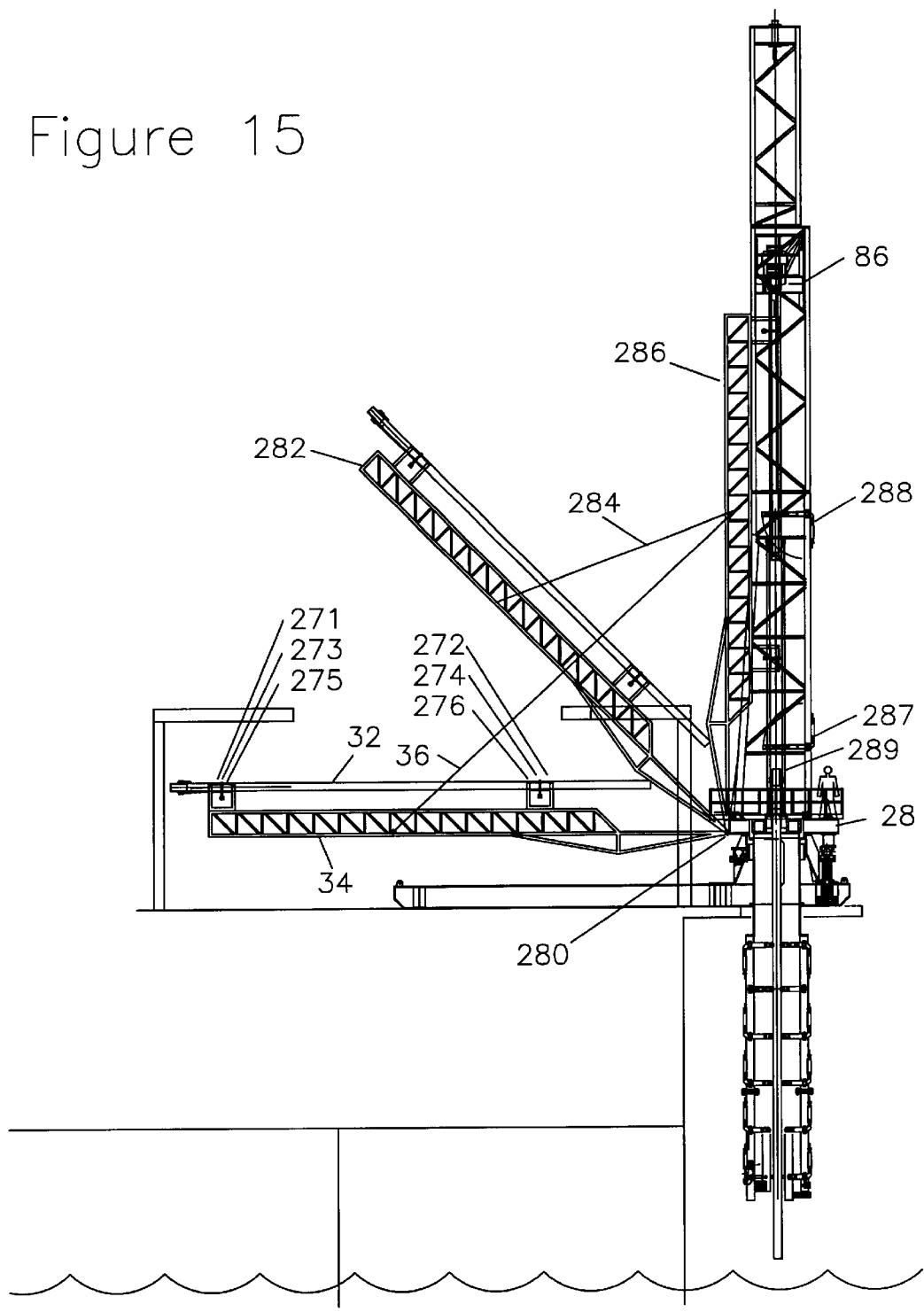
FIG. 15 illustrates the erector system of the embodiment.

Referring now to FIG. 15, the erector 34 with new pipeline section 32 is shown in the horizontal position. Erector boxes 271 and 272 provide clamps 273 and 274 for securing new pipeline section 32 to erector 34. Additionally, erector boxes 271 and 272 may provide rollers 275 and 276 for supporting new pipe section 32 and the rollers may be powered with hydraulic motors or the such like to rotate the new pipe section 32. This can be beneficial when the new pipe sections are not perfectly round and the out of roundness of one joint is desired to be matched with the out of roundness of the next joint to simplify the welding process.

The erector 34 is attached to the working table 28 by hinge 280. Item 282 is the erector 34 shown pulled partially to the mast by cable 284. The erector 34 and new pipe section 32 is represented fully up in the mast by item 286. As the working table 28 can be gimbaled up to 15° in any direction by operation of the jack assemblies 42, the required position of the erector 34 to properly engage the mast sections 22, 24, and 26 is difficult to predict. By hinging the erector on the working table itself at 280, the erector will automatically track the position of the mast sections and automatically be correctly engaged when erected to the position shown at 286.

Within the mast, a centralizer 287 and a straightener 288 are shown which cooperate with the travelling table 86 in making the weld between the current pipeline 16 and the new pipeline section 32 at 289. These will be discussed further detail later.

Figures 16, 17:
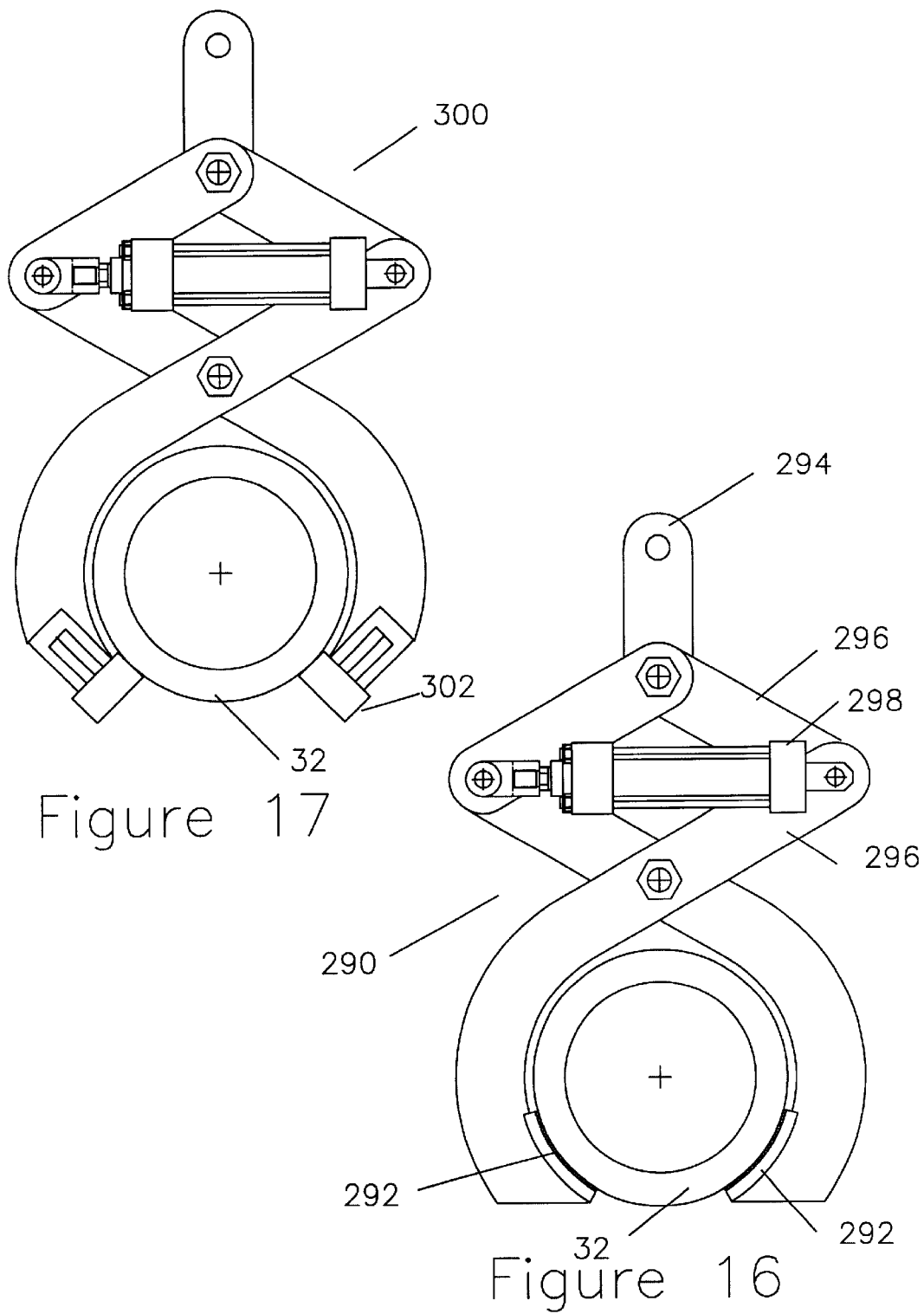
FIG. 16 illustrates the tongs which are used to handle the pipeline.
FIG. 17 illustrates tongs which are used to handle the pipeline, having rollers rather than pads to allow moving the tongs along the pipe section under load.

Referring now to FIG. 16, tongs 290 are shown which are utilized by the jib cranes 38 and 40 to handle the new pipe sections 32. The tongs have pads 292 to engage the pipeline while protecting the coating, a link 294 at the top which when pulled causes linkages 296 to close, automatically locking onto the new pipe section 32, and a hydraulic cylinder 298 to release the tongs 290 when desired.

Referring now to FIG. 17, an alternate style of tong 300 is shown which provides rollers 302 which can move along the new pipeline section 32 to accommodate the arcuate swing of the jib cranes.

Figure 18:
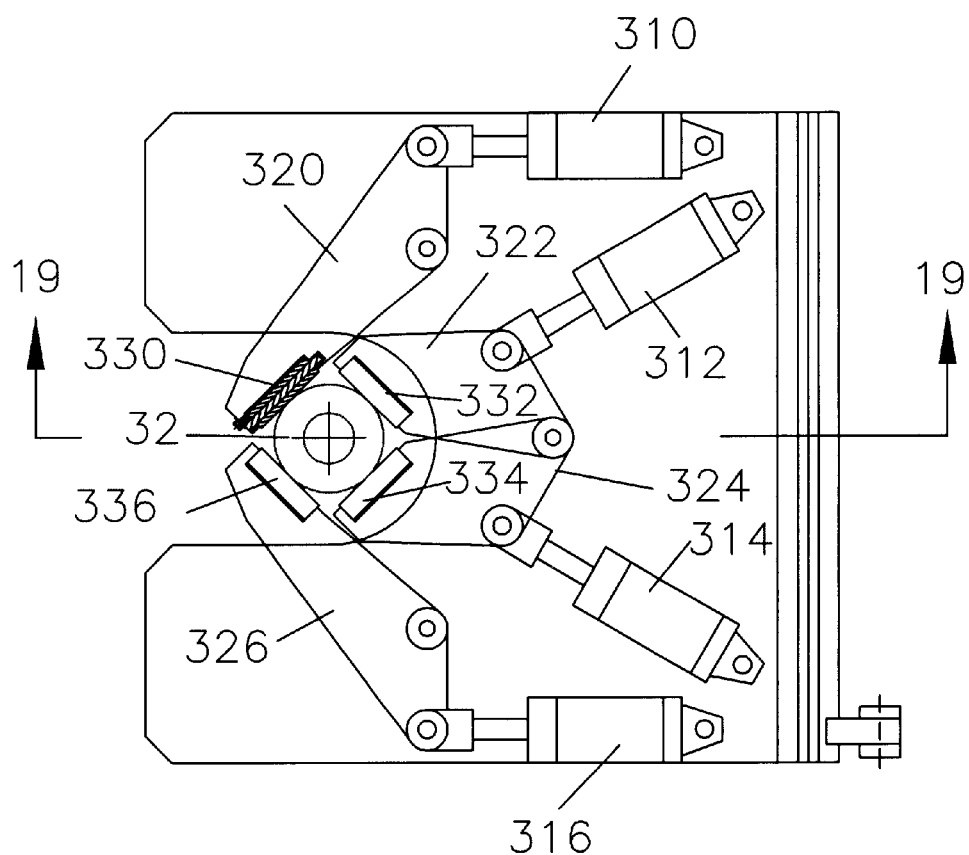
FIG. 18 shows a partial section through the weld alignment and placement system.

Referring now to FIG. 18, a partial section thru a centralizer 287 is shown which is used to align the bottom of the new pipeline section 32 near the bottom with the top of the already welded pipeline in at the working table at 296 (see FIG. 15). Four hydraulic cylinders 310, 312, 314, and 316 press on pivot arms 320, 322, 324, and 326 to load rollers 330, 332, 334, and 336 against new pipe section 32. By adjustment of the pressures and positions of the cylinders, the lower end of new pipeline section 32 can be properly aligned with the top of the pipeline 16 for welding.

A similar device referred to as a straightener 288 is positioned near the center of the new pipeline section 32 to push the center of the new pipeline section while the upper and lower ends are restrained by the travelling table 86 and the centralizer 287 respectively. This imparts a bending moment to the new pipeline section 32 which can promote better angular alignment of the faces of the ends of the pipe sections for welding.

Figure 19:
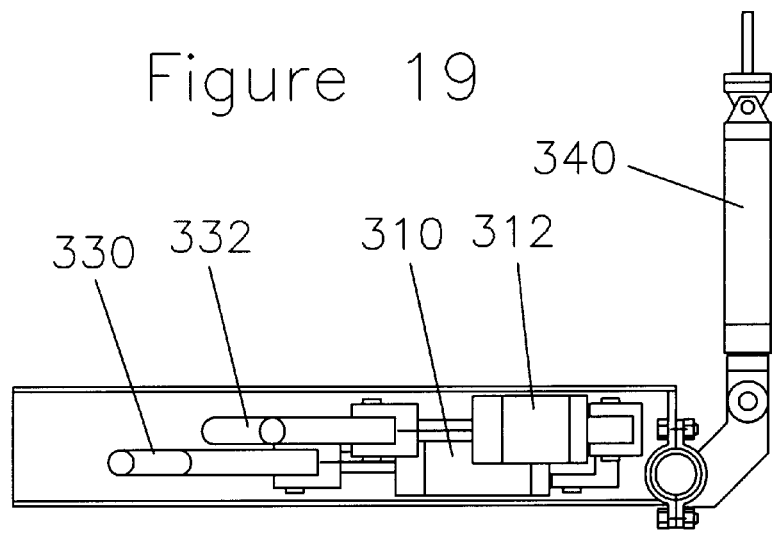
FIG. 19 shows a half section through FIG. 18.

Referring now to FIG. 19, a half section of the straightener 287 or centralizer 288 is shown with the cylinder 340 for folding the units up and out of the way to allow passage of the travelling table 86 when required.

Figure 21:
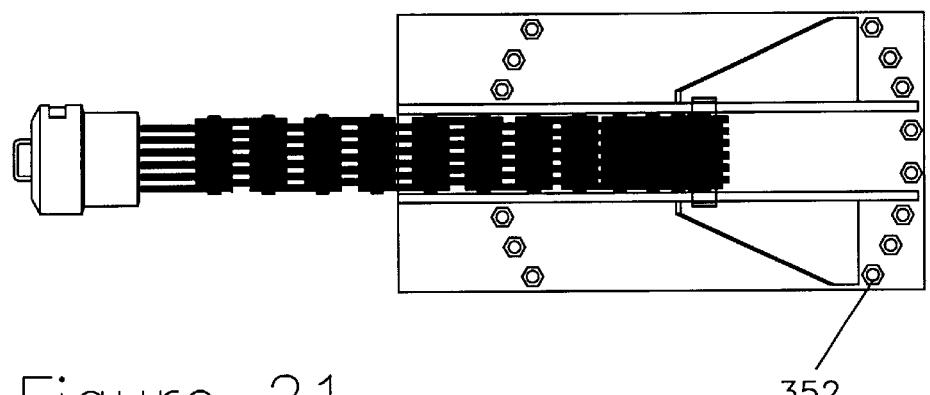
FIG. 21 illustrates a top view of FIG. 20.
Figure 20:
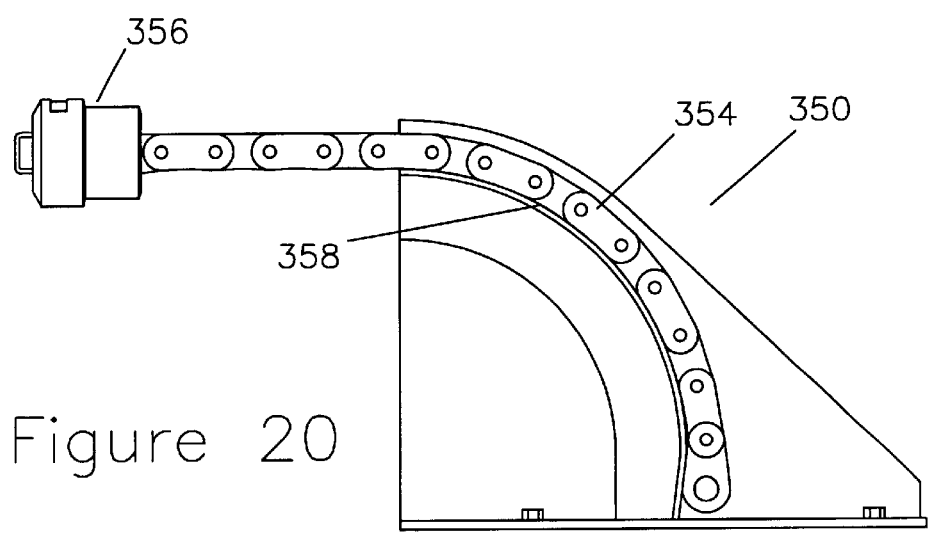
FIG. 20 illustrates a bootstrap mechanism as may be used in some alternative embodiments to erect the articulated tower.

Referring now to FIGS. 20 and 21, bootstrap mechanism 350 is shown which is bolted to the top of the working table 28 with bolts 352, and provides a heavy chain 354 attached to a dummy double collar 356. As shown, the heavy chain 354 is wrapped around a reinforced curved member 358.

Figure 22:
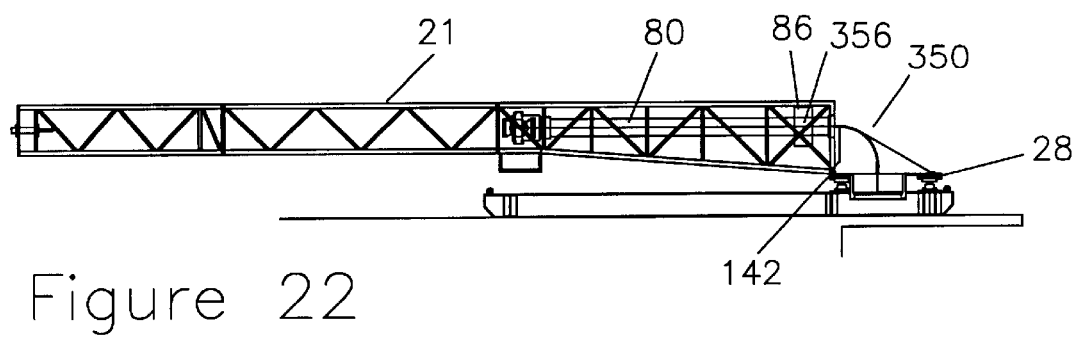
FIG. 22 illustrates the installation of the bootstrap mechanism of FIGS. 20 and 21 onto the tower.

Referring now to FIG. 22, the bootstrap mechanism 350 is installed on the working table 28, the mast 21 is attached at pivot pin 142 and the dummy double collar 356 is connected into the travelling table 86. When the main cylinders 80 are pressured for extension, the cables pull on the travelling table 86, which pulls on the dummy double collar 356, which pulls on the heavy chain 354, which pulls on the floor of the working table 28. Rather than lifting the working table (lifting oneself by your bootstraps), the mast 21 itself is erected with its attachments. In this way the power of the system can be used to advantage to self erect itself when adequate cranes are not available.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An erector for raising a pipe section into vertical alignment with a mast which is gimballed with at least 2 degrees of angular freedom, said erector comprising a main support arm, a support for said pipe section on said main support arm, one or more hinges interconnecting said erector to said mast, such that when said mast is gimballed to a new position, said erector is similarly gimballed to said new position and said pipe section on said support arm will thereby be aligned with said mast when said support arm is raised to said mast.

2. The erector of claim 1, further comprising grippers on said main support arm for gripping said pipe section.

3. The erector of claim 2, wherein said grippers will release the pipe section to the control of other grippers in the mast when said pipe section is raised into vertical alignment with said mast.

4. The erector of claim 1, further comprising an intermediate table interconnecting said erector and said mast.

5. The erector of claim 2, wherein said mast has a central axis and said erector raises said pipe section to said central axis.

6. The erector of claim 1, wherein said erector raises said pipe section from a near horizontal attitude to a near vertical attitude.

7. The erector of claim 1, wherein said support for said pipe section on said main support arm is a multiplicity of rollers.

8. The erector of claim 7, wherein said rollers allow said pipe section to be rotated into a preferred orientation with respect to welding when said pipe section is erected into said mast.

9. The erector of claim 8, wherein said rollers are powered to assist in rotation of said pipe section into said preferred orientation.

10. The erector of claim 1, further comprising a walkway on said main support arm for personnel access when said support arm is in a near horizontal attitude.

11. The erector of claim 1, wherein said support can be moved axially along said main support arm such that the position of said pipe section will be changed relative to said mast when said pipeline section is erected into said mast.

12. An erector for raising a pipe section into vertical alignment with a mast which is gimbaled with at least 2 degrees of angular freedom, said erector comprising a main support arm, a support for said pipe section on said support arm, one or more hinges interconnecting said main support arm to said gimbaled mast, such that when said mast is in a first position, said pipe section will be pivoted into alignment with said mast, and further that when said mast is gimbaled to a new position, said hinges are similarly gimbaled to said new position and said pipe section on said support arm will thereby be aligned with said mast when said support arm is raised to said mast.

13. The erector of claim 12, further comprising that said one or more hinges are two hinges.

* * * * *